J. P. SNEDDON.

SUPERHEATER BOILER.

APPLICATION FILED MAY 2, 1914.

Reissued Mar. 25, 1919.

14,620.

3 SHEETS—SHEET 1.

WITNESSES

R. A. Waldenson

G. B. Blanning

INVENTOR

James P. Sneddon by Pat Connell Byers & Pomeroy his attys

J. P. SNEDDON.

SUPERHEATER BOILER.

APPLICATION FILED MAY 2, 1914.

Reissued Mar. 25, 1919.

14,620.

3 SHEETS—SHEET 2.

WITNESSES

R. A. Balderson

G. B. Blming

INVENTOR

James P. Sneddon by Bakewell Byers & Bonnell his attys

J. P. SNEDDON.

SUPERHEATER BOILER.

APPLICATION FILED MAY 2, 1914.

Reissued Mar. 25, 1919.

14,620.

3 SHEETS—SHEET 3.

WITNESSES

R. A. Balderson

G. B. Bleiming

INVENTOR

James P. Sneddon by Baldwin, Rymes & Pomeroy his attys

UNITED STATES PATENT OFFICE.

JAMES P. SNEDDON, OF BARBERTON, OHIO, ASSIGNOR TO THE BABCOCK & WILCOX COMPANY, OF NEW YORK, N. Y., A CORPORATION OF NEW JERSEY.

SUPERHEATER-BOILER.

14,620. Specification of Reissued Letters Patent. Reissued Mar. 25, 1919.

Original No. 1,045,207, dated November 26, 1912, Serial No. 360,850, filed March 6, 1907. Application for reissue filed May 2, 1914. Serial No. 836,036.

*To all whom it may concern:*

Be it known that I, JAMES P. SNEDDON, a citizen of the United States, residing at Barberton, in Summit county, State of Ohio, have invented a new and useful Improvement in Superheater-Boilers, of which the following is a full, clear, and exact description, reference being had to the accompanying drawings, forming part of this specification, in which—

Figure 1:
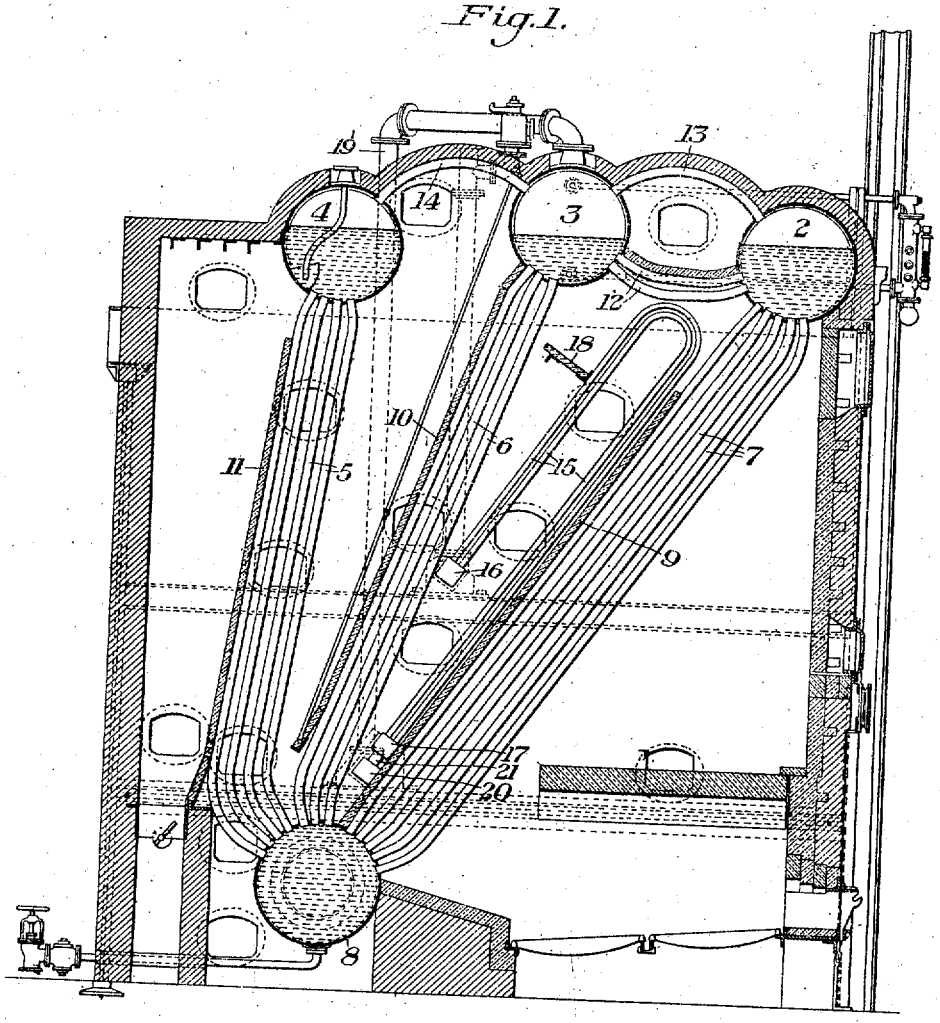
Figure 1 is a sectional side elevation showing one form of superheater constructed in accordance with my invention, in combination with a boiler.
Figure 2:
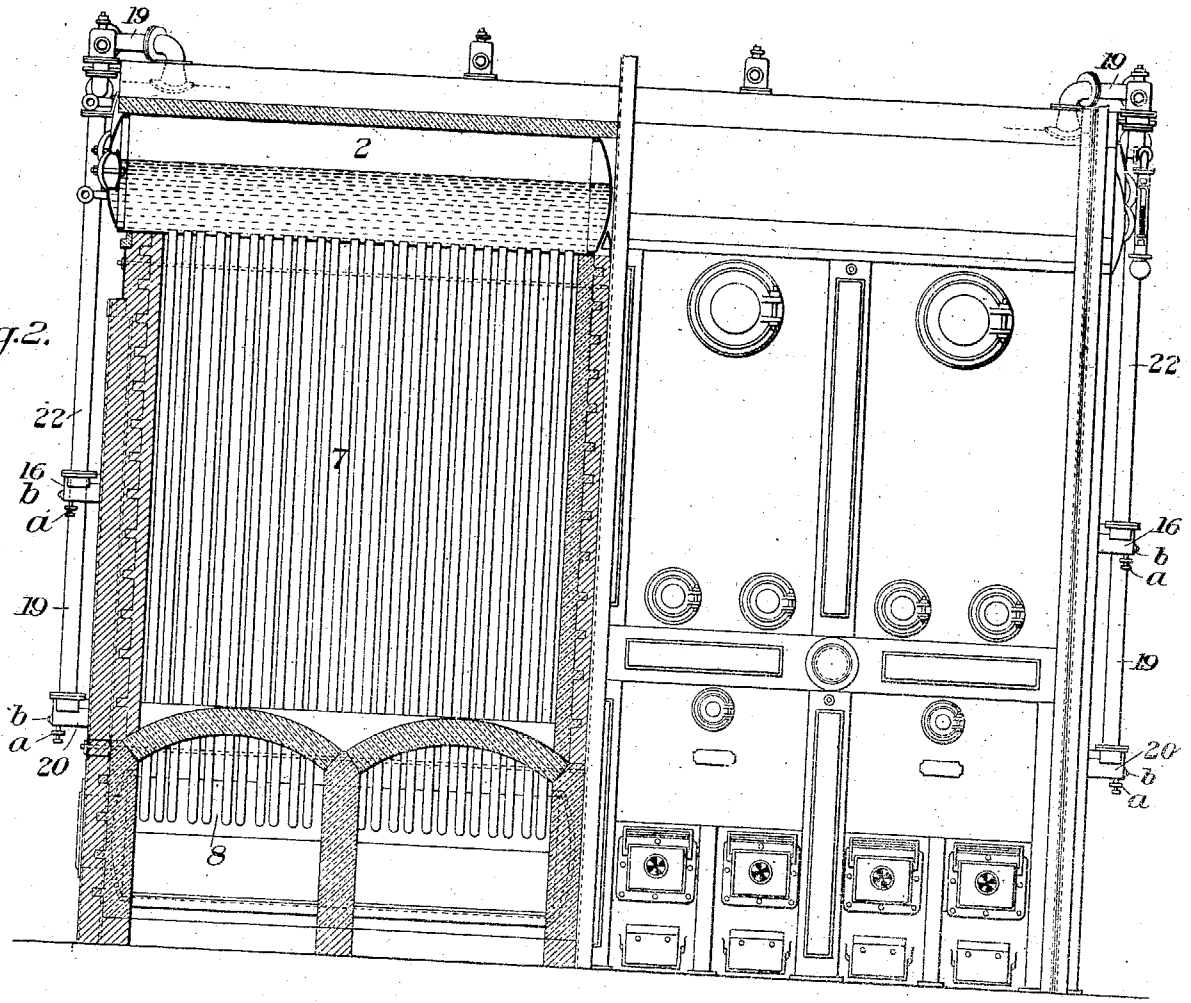
Fig. 2 is a front elevation of the same, one half being in section.

My invention relates to the class of superheaters and superheater boilers, and is designed particularly to provide a connection from the steam space of the boiler to the inner portion of the superheater-header or supply-chamber, with the use of an external supply-pipe outside the setting.

It is also designed to provide for proper drainage of superheater boxes or headers, to increase the superheater tube surface, and provide an efficient and long-lived apparatus.

In the drawings, wherein I show my invention as applied to a four-drum Stirling boiler, 2, 3 and 4 represent steam and water drums connected by banks of tubes 5, 6 and 7, with a mud-drum 8. The usual baffles 9, 10 and 11, extend along the rear portions of these banks of tubes; and the drums 2 and 3 are preferably connected by the water circulators 12 and steam circulators 13. Any steam generated in the drum 4 passes through tubes 14 to a steam space of drum 3, whence it goes to the superheater.

In the form shown, the superheater is located in the second pass and between the baffle 9 and the middle bank of tubes 6. It consists of U-shaped tubes 15, connecting the headers or boxes 16 and 17, which extend transversely and preferably from side to side of the setting. In order to increase the superheating surface, I preferably extend the front leg of the tubes beyond the other leg. I also preferably provide a baffle-shelf 18, between the rear leg of the superheater and the tubes 6, thus dividing the gates and causing them to flow down among the tubes 6 and the superheater tubes 15.

The steam-supply pipe 19 leads down from the drum 3 externally of the setting and is secured preferably by a flanged side connection to the projecting end portion of an added dead-header 20, which extends parallel with and slightly below the header 17. This dead-header 20 is connected by suitable nipples 21 with the inner end portion of the superheater-inlet-header 17, thus supplying steam to the superheater tubes which are farthest from the supply pipe. This peculiar connection prevents short-circuiting of the steam through the tubes of the superheater nearest the supply pipe, which would cause burning out of the inner superheater tubes when the boiler was operated considerably below its capacity. The other or superheater outlet-header 16 also preferably projects beyond the side wall and has flanged side connection with the outlet pipe 22 for the superheated steam. The superheater headers are preferably provided at their outer ends with hand-hole covers *b* and drain-pipes *a*. The inner ends of the headers are also arranged an inch or two higher than the outer ends to provide proper drainage.

Figure 3:
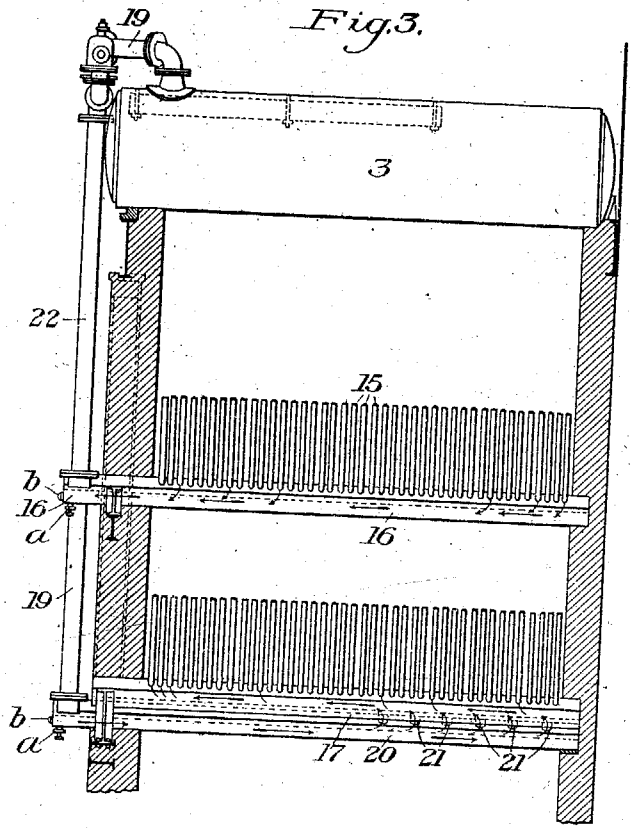
Figs. 3 and 4 are broken detail views showing the arrangement and connections of the superheater headers or boxes.
Figure 4:
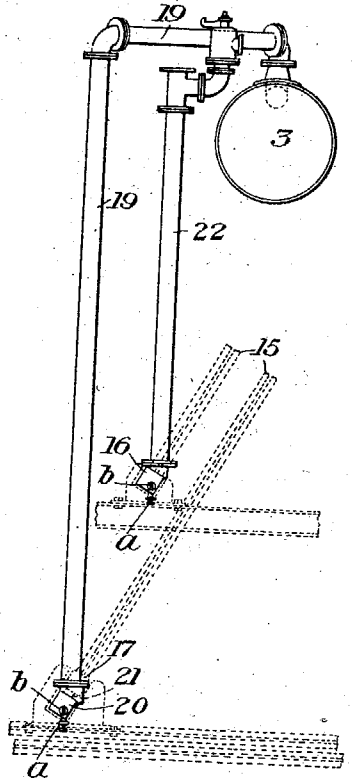

As shown in Figs. 3 and 4, I-beams 23 are embedded in the side walls of the boiler setting; and to these I-beams are riveted or otherwise secured saddles 24 having angular recesses to receive the superheater headers. These recessed saddles serve to support the superheater headers and to resist the overturning moment due to the overhanging of the superheater tubes.

I have illustrated the superheater boiler as arranged in duplex form, with two units arranged side by side, having a common inner wall, and the superheater headers projecting in opposite directions through the opposite side wall. The construction may, however, be used in one or any number of units.

The advantages of my invention result from the use of the steam supply connection or dead-header, which is connected to the inner portion of the inlet header or box. Also from the side connections on the projecting ends of the headers, which provide for access and drainage at the end; and further from the arrangement of the superheater legs, baffleshelf, saddle supports for the superheater, etc.

As to the features of the superheater proper, in their broader novelty they may be applied to various types of superheaters, arranged in different parts of the boiler setting.

Many changes may also be made in the form and arrangement of the boiler, setting, etc., without departing from my invention.

I claim:

1. A steam superheater having headers within the boiler setting, tubes connecting said headers, a dead-header adjacent to one of said headers and within the boiler setting, an inlet pipe leading from the steam space of the boiler to one end of the dead-header, a connection between the dead-header and the adjacent header, and a steam offtake pipe leading from the other header, substantially as described.

2. A steam superheater having headers within the boiler setting, tubes connecting said headers, a dead-header adjacent to one of said headers and within the boiler setting, an inlet pipe leading from the steam space of the boiler to the dead-header at one side of the setting, a plurality of connections between the dead-header and the adjacent header at the other side of the boiler setting, and an offtake pipe communicating with the other header, the offtake pipe and the communication between the dead-header and the header being at opposite ends of the superheater, substantially as described.

3. A steam superheater having headers within the boiler setting and extending beyond said setting, tubes connecting said headers within the boiler setting, a dead-header adjacent to the lower header and extending beyond the boiler setting, an inlet pipe exterior of the boiler setting leading from the steam space of the boiler to the dead-header, connections between the dead-header and the lower header, and an offtake pipe exterior of the boiler setting communicating with the upper header, substantially as described.

4. The combination with a steam boiler setting, of a superheater therein comprising transverse headers extending across the setting, tubes secured in the headers and overhanging the same, and metallic supports in the setting walls arranged to receive said headers and resist the overturning moment of the tubes, said supports being protected by the walls from contact with the flame and gases, substantially as described.

5. A steam boiler superheater comprising headers, upwardly projecting U-tubes secured thereto, both legs of said tubes extending in approximately the same direction and at an angle to the vertical and horizontal, recessed saddles to receive the headers arranged to prevent overturning thereof, and beams to which said saddles are secured, substantially as described.

6. A superheater boiler having transverse superheater headers, upwardly projecting tubes secured thereto, supports extending underneath the headers, recessed saddles for receiving the headers on said supports and arranged to resist the overturning moment of the tubes, the supports and saddles being beyond the inner surfaces of the side walls and protected from the flame and gases, substantially as described.

7. A steam boiler superheater comprising rectangular headers and U-shaped tubes expanded into said headers, and supports extending beneath the headers, said supports being protected by the brickwork of the boiler setting, and comprising saddles having angular recesses forming seats for the headers and cross beams upon which the saddles rest and to which they are secured, substantially as described.

In testimony whereof, I have hereunto set my hand this 29th day of April, 1914.

JAMES P. SNEDDON.

Witnesses:
A. N. Lowes,
M. E. Hamlin.

Copies of this patent may be obtained for five cents each, by addressing the "Commissioner of Patents, Washington, D. C."